Patented May 26, 1925.

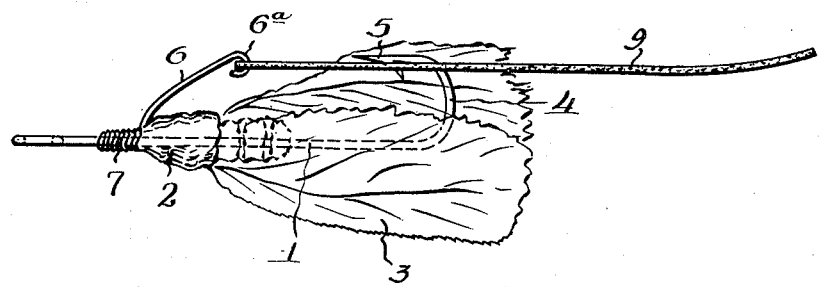
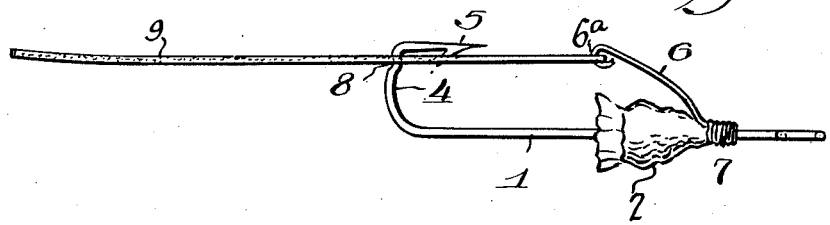
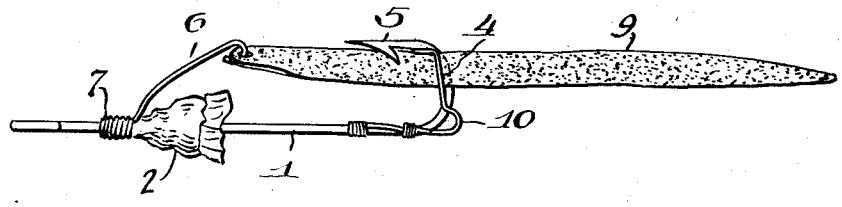

1,538,909

UNITED STATES PATENT OFFICE.

JESSE P. SHANNON, OF LAKE GENEVA, WISCONSIN.

FISHING LURE.

Application filed November 1, 1924. Serial No. 747,143.

*To all whom it may concern:*

Be it known that I, JESSE P. SHANNON, a citizen of the United States of America, and a resident of Lake Geneva, Wisconsin, have invented a certain new and useful Improvement in Fishing Lures, of which the following is a specification.

This invention relates to improvements in fishing lures and more especially to an artificial bait for casting and trolling for game fish.

The foundation of the lure is a hook concealed in or disguised by a dress of bright feathers or other devices calculated to attract the fish. To further carry out the deception, a strip of pork rind is preferably attached to the lure in such a way as to trail behind the hook with a wriggling motion resembling the movement of a small fish following the bait through the water.

The object of the invention is to provide a new and novel method of attaching a strip of pork rind to the lure, so that it not only produces the desired effect as a lure, but to serve as a weed guard, thus rendering the hook weedless.

A preferred embodiment of the invention is disclosed in the accompanying drawings, in which Figure 1 is a perspective view of the lure with the pork strip attached in one of the several methods.

Figure 2 is an enlarged detail view of the bared hook showing another method of attaching the pork strip to the hook.

Figure 3 is a view of a modified form of hook suitable for attaching a pork strip so as to make the hook weedless, and Figure 4 is a perspective view of a strip of pork rind especially prepared for use with the lure herein disclosed.

It is to be mentioned at the outset that there may be several variations of the lure as to the means used for attaching the pork strip to the hook at the barbed end, although the same means is used in each case for attaching the end of the strip forwardly of the barb.

In Figures 1 and 2 are shown two simple and effective methods of accomplishing the weedless effect. The hook used for the foundation of the lure is of the standard type or style except for a slight departure presently to be pointed out. To the shank 1 of the hook and near its upper end is attached a weight 2 to which is attached the feathered mass 3 extending rearwardly, and partially, if not entirely conceals the barbed end.

The free end of the hook terminates in the usual rounded portion 4 and barbed end 5 pointing rearwardly.

A short distance below the upper or eyed end of the shank is a spring arm 6 preferably of wire secured to the shank by the wrappings 7 of wire just beyond the base of the weight 2. This spring arm extends outwardly and away from the shank with a slight curvature and toward the back of the hook and lies in the plane of the hook. The extremity of the arm terminates in an open loop or hook 6ª spaced forwardly and in line with the point of the hook.

The pork strip 9 used with the lure is preferably the rind cut into thin elongated pieces (Fig. 4) with a slit 9ª at its forward end and another slit 9ᵇ intermediate its ends. To secure the strip 9 to the lure the slit at the forward end is attached to the hook 6ª at the end of the spring arm 6, and then passing the point of the hook through the intermediate slit 9ᵇ so that the adjacent portion passes beneath the barbed end and the free portion trails loosely to the rear.

Either one of two methods may be used for securing the strip to the barbed end after passing it through the strip. First, as shown in Figure 1, the strip may be drawn taut so as to draw it tightly across the space between the end of the arm 6 and the point of the hook, at the same time forcing up against the barb which penetrates the strip and holds it tightly in place and under tension, or, secondly, as shown in Figure 2, a notch or indentation 8 may be bent in the rounded portion 4 of the hook just rearwardly of the barb so that by drawing the strip taut the end of the slit 9ᵇ will rest in the notch.

In this way the opening in front of the point of the hook is closed, so that weeds or other obstructions that would otherwise be caught on the hook, are diverted thus leaving the hook free. When a fish strikes the lure the taut portion of the strip 9 is carried away from the point, the pressure thereon depressing the end of the spring arm which affords sufficient slack to release the central portion of the strip either from the barb or the notch 8 allowing it to slide down the rounded portion 4 of the hook. After the fish strikes the lure, the strip is reset.

Still another method may be adopted for attaching the strip to the hook, which consists in using a wire harness or frame 10, attached to the shank and straddling the rounded portion 4 of the hook (Figure 3).

This particular device is shown and described in a prior application, Serial No. 676,491, filed November 23, 1923, its purpose being to provide an eye through which the pork strip may be threaded, not only to secure it to the hook but to turn it into the plane of the hook, so that as the hook trails through the water the strip will take a vertical position with a sidewise wriggling or weaving motion, resembling a small fish swimming. This harness or frame is made from a length of wire bent double, its free end being wired to the shank 1. The two strands of wire follow the general curvature of the hook, passing on either side of the shank, and terminating in a U-shaped end portion bent at right angles and straddling the rounded portion 4 of the hook below the barbed end. To insert the strip after it has been attached at its forward end to the spring arm 6, the frame is pressed inwardly so as to permit the strip to pass through the opening in the end of the spring arm, whereupon the frame is released and the strip held firmly in place, as shown in Figure 3.

This latter arrangement also affords protection against weeds in somewhat the same manner as before described, in that the edge of the strip passes just below the point of the hook and fends off the weeds as the bait passes through the water.

This lure therefore combines the features of attractive deception essential to any artificial bait, a convenient rig for attaching pork strips, and a novel use of the strip as a weed guard.

I claim as my invention:

1. A fishing lure comprising a hook, a resilient arm secured to the shank of the hook above the hooked end thereof and terminating forwardly of and in line with the barbed end of the hook in an attaching member adapted to engage one end of a strip of pork rind or the like, and means associated with the barbed end of the hook for securing said strip intermediate its ends.

2. A fishing lure comprising a hook, a resilient arm secured to the shank of the hook and extending outwardly toward the point of the hook and terminating short thereof in a looped end adapted to have one end of a strip of pork rind or the like attached thereto, and means for attaching said strip adjacent the barbed end of the hook point.

3. A fishing lure comprising a hook, a resilient arm secured to the shank of the hook and extending outwardly and rearwardly therefrom toward the barbed point of the hook and terminating short thereof in a hooked end adapted to have one end of a strip of pork rind or the like attached thereto, and means for holding said strip relatively taut between said arm and the barbed end of said hook.

4. A fishing lure comprising a hook, a resilient arm secured to the shank of the hook and extending outwardly and toward the point of the hook and terminating short thereof in a hooked end, adapted to have one end of a strip of pork rind or the like attached thereto, the point of the hook passing through said strip, and means for holding said strip substantially taut between its attached end and the point of the hook.

5. A fishing lure comprising a hook, a resilient arm secured to the shank of the hook and extending outwardly therefrom toward the point of the hook and terminating forwardly thereof in a hooked end adapted to have one end of a strip of pork rind or the like attached thereto, the point of the hook passing through a slit in said strip, and a notch in the hook adjacent the point thereof and adapted to engage said slit to hold the strip substantially taut between its attached end and said point.

Signed at Lake Geneva this 25 day of October 1924.

JESSE P. SHANNON.